(12) United States Patent
Matsumoto et al.

(10) Patent No.: US 11,104,759 B2
(45) Date of Patent: Aug. 31, 2021

(54) POLYOL FOR CROSSLINKABLE POLYURETHANE RESIN COMPOSITION, AND CROSSLINKABLE POLYURETHANE RESIN

(71) Applicant: HODOGAYA CHEMICAL CO., LTD., Tokyo (JP)

(72) Inventors: Akihiro Matsumoto, Tokyo (JP); Yuo Maruyama, Tokyo (JP)

(73) Assignee: HODOGAYA CHEMICAL CO., LTD., Tokyo (JP)

( * ) Notice: Subject to any disclaimer, the term of this patent is extended or adjusted under 35 U.S.C. 154(b) by 28 days.

(21) Appl. No.: 16/439,864

(22) Filed: Jun. 13, 2019

(65) Prior Publication Data

US 2019/0382523 A1 Dec. 19, 2019

(30) Foreign Application Priority Data

Jun. 15, 2018 (JP) .............. JP2018-114917
Jun. 11, 2019 (JP) .............. JP2019-108531

(51) Int. Cl.

| | |
|---|---|
| *C08G 63/60* | (2006.01) |
| *C08G 18/48* | (2006.01) |
| *C08G 18/42* | (2006.01) |
| *C08G 18/76* | (2006.01) |
| *C08G 18/66* | (2006.01) |
| *C08G 18/32* | (2006.01) |
| *C08G 63/672* | (2006.01) |

(52) U.S. Cl.
CPC ..... *C08G 18/4887* (2013.01); *C08G 18/3206* (2013.01); *C08G 18/6674* (2013.01); *C08G 18/7671* (2013.01); *C08G 63/672* (2013.01)

(58) Field of Classification Search
CPC .............. C08G 63/672; C08G 18/4887; C08G 18/3206; C08G 18/6674; C08G 18/7671
See application file for complete search history.

(56) References Cited

U.S. PATENT DOCUMENTS

| | | | |
|---|---|---|---|
| 6,716,892 B1 * | 4/2004 | Mori .................... | C08F 290/00 |
| | | | 522/92 |
| 2006/0155034 A1 | 7/2006 | Gijsman et al. | |
| 2008/0146717 A1 | 6/2008 | Gijsman et al. | |
| 2008/0146718 A1 | 6/2008 | Gijsman et al. | |
| 2014/0142257 A1 * | 5/2014 | Nagatani ............ | C08G 18/4018 |
| | | | 525/454 |
| 2014/0275385 A1 | 9/2014 | Gijsman et al. | |
| 2014/0288224 A1 | 9/2014 | Gijsman et al. | |
| 2018/0362799 A1 * | 12/2018 | Steinmetz ............ | C08G 63/668 |

FOREIGN PATENT DOCUMENTS

| | | |
|---|---|---|
| CN | 105153410 B * | 3/2019 |
| JP | 62-22817 | 1/1987 |
| JP | 6-136321 | 5/1994 |
| JP | 7-47690 | 5/1995 |
| JP | 2006-528260 | 12/2006 |
| JP | 2008-527127 | 7/2008 |
| JP | 2008-527129 | 7/2008 |
| JP | 2010-270318 | 12/2010 |

OTHER PUBLICATIONS

CN-105153410_Mar. 2019_English.*

\* cited by examiner

*Primary Examiner* — Michael L Leonard
(74) *Attorney, Agent, or Firm* — Greenblum & Bernstein P.L.C.

(57) ABSTRACT

The present invention relates to a polyol for a crosslinkable polyurethane resin composition, containing a high molecular polyol represented by the following formula (1) or (2), in which the high molecular polyol is a condensate of a polyfunctional carboxylic acid (A) with a bifunctional polyether polyol (B), the high molecular polyol has a number average molecular weight (Mn) in a range of 1,000 to 10,000, and the polyol for a crosslinkable polyurethane resin composition has a content of the high molecular polyol of 0.1 wt % to 15 wt %.

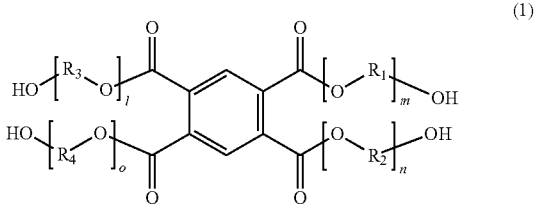

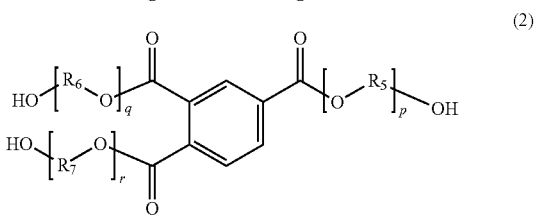

10 Claims, 1 Drawing Sheet

POLYOL FOR CROSSLINKABLE POLYURETHANE RESIN COMPOSITION, AND CROSSLINKABLE POLYURETHANE RESIN

TECHNICAL FIELD

The present invention relates to a polyol for a crosslinkable polyurethane resin composition, and further relates to a high functional crosslinkable polyurethane resin having improved various physical properties such as heat resistance.

BACKGROUND

Polyether polyols containing tetrahydrofuran unit have excellent elastic properties, low-temperature properties, hydrolysis resistance and the like, and are extremely useful material on chemical industries in polyurethane elastic fibers, polyurethane elastic bodies, polyether polyester elastic bodies, elastic paints containing polyurethane, and the like. Rubber elasticity of a polyurethane resin is developed because hard segments having toughness are insolubilized from a matrix of soft segments having flexibility to form a domain. However, a polyurethane resin is generally a material having poor heat resistance and has a problem that rubber elasticity generally disappears by the melting of hard segments at 100 to 140° C. to cause liquefaction.

For example, regarding an engine room of electric vehicles in recent years, environmental temperature in the engine room is increased with the increase of engine output, densification of parts, and the like, and heat-aging resistance as never before is being required.

As a method of improving heat-aging resistance to solve the above-mentioned problems, there have been known a method of increasing the proportion of hard segments, a method of introducing many urea bonds into hard segments, a method of synthesizing a hybrid body with inorganic glass, a method of adding copper halide, potassium halide, an oxazole compound or the like as a heat stabilizer, and the like. Those technologies are employed in parts that are used to be exposed to high temperature environment at about 150° C. in the fields of automobile parts and electric and electronic parts.

However, the method of increasing the proportion of hard segments and the method of introducing many urea bonds into hard segments involve the increase of viscosity of the polyurethane resin, which is not preferred. The method of synthesizing hybrid material with inorganic glass increases performances such as heat resistance by filler effect, but on the other hand, glass particles are dispersed in the whole polyurethane resin and thus, flexibility of soft segments, which is inherent in a polyurethane resin, may be lost to be brittle. The method of adding an oxazole compound or the like as a heat stabilizer may cause deterioration of stability of heat-aging resistance and mechanical strength. Thus, those methods require further improvement in the present circumstances.

Patent Literature 1: JP-B H07-47690
Patent Literature 2: JP-T 2006-528260
Patent Literature 3: JP-T 2008-527127
Patent Literature 4: JP-T 2008-527129
Patent Literature 5: JP-A 2010-270318
Patent Literature 6: JP-A S62-22817
Patent Literature 7: JP-A H06-136321

SUMMARY

The present invention has made in view of the above problems. The present invention relates to a polyol for a crosslinkable polyurethane resin composition, and further relates to a high functional crosslinkable polyurethane resin having improved various physical properties such as heat resistance.

As a result of intensive investigations to solve the above-described problems, the present inventors have reached the present invention. Specifically, the present invention provides the following polyol for a crosslinkable polyurethane resin composition and a crosslinkable polyurethane resin using the same.

[1] A polyol for a crosslinkable polyurethane resin composition, containing a high molecular polyol represented by the following formula (1) or (2), in which the high molecular polyol is a condensate of a polyfunctional carboxylic acid (A) with a bifunctional polyether polyol (B), the high molecular polyol has a number average molecular weight (Mn) in a range of 1,000 to 10,000, and the polyol for a crosslinkable polyurethane resin composition has a content of the high molecular polyol of 0.1 wt % to 15 wt %.

[Chem. 1]

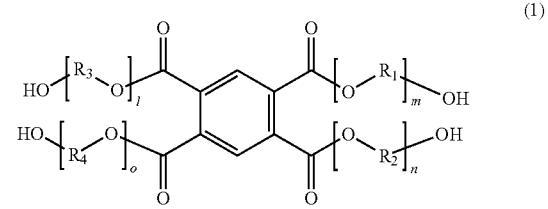

(1)

(In the formula, $R_1$ to $R_4$ each independently represent an alkyl chain having a carbon atom number of 3 to 5, and m, n, l and o each independently are an integer of 3 to 30.)

[Chem. 2]

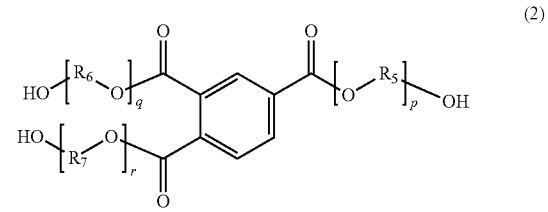

(2)

(In the formula, $R_5$ to $R_7$ each independently represent an alkyl chain having a carbon atom number of 3 to 5, and p, q and r each independently are an integer of 3 to 30.)

[2] The polyol for a crosslinkable polyurethane resin composition, described in [1], in which the polyfunctional carboxylic acid (A) is at least one selected from the group consisting of pyromellitic acid and trimellitic acid.

[3] The polyol for a crosslinkable polyurethane resin composition, described in [1], in which the bifunctional polyether polyol (B) has a carbon atom number of 3 to 5 in a repeating unit.

[4] The polyol for a crosslinkable polyurethane resin composition, described in [3], in which the bifunctional polyether polyol (B) is at least one selected from the group consisting of polytetramethylene ether glycol and polypropylene ethylene polyol.

[5] A crosslinkable polyurethane resin, which is a reaction product of the polyol for a crosslinkable polyurethane resin composition, described in any one of [1] to [4] above, with an organic polyisocyanate component.

[6] The crosslinkable polyurethane resin described in [5] above, having a storage modulus (E') at 10 Hz in a temperature range of 100° C. to 150° C. decreasing 0% to 70% with respect to a storage modulus (E') at 10 Hz at 20° C. in a dynamic viscoelasticity measurement.

[⁷] The crosslinkable polyurethane resin described in [5] above, having a storage modulus (E') at 10 Hz in a temperature range of 0° C. to −5° C. increasing 10% to 150% with respect to a storage modulus (E') at 10 Hz at 20° C. in a dynamic viscoelasticity measurement.

[⁸] The crosslinkable polyurethane resin described in [5] above, having a storage modulus (E') at 10 Hz in a temperature range of 0° C. to −5° C. increasing 10% to 150% and a storage modulus (E') at 10 Hz in a temperature range of 100° C. to 150° C. decreasing 0% to 70%, with respect to a storage modulus (E') at 10 Hz at 20° C. in a dynamic viscoelasticity measurement.

The crosslinkable polyurethane resin that is a product obtained by reacting the polyol for a crosslinkable polyurethane resin composition in the present invention with an organic polyisocyanate component has excellent heat resistance in high temperature region. Therefore, stability of heat-aging resistance and mechanical strength is improved. Furthermore, the crosslinkable polyurethane resin has satisfactory viscoelasticity in low temperature region. Therefore, flexibility of soft segments, which is inherent in a polyurethane resin, is not lost and various properties are improved, including not becoming brittle in low temperature region. According to the present invention, a polyol for the crosslinkable polyurethane resin composition having satisfactory strength, heat resistance and the like, and the crosslinkable polyurethane resin can be provided.

EMBODIMENTS

Figure 1:
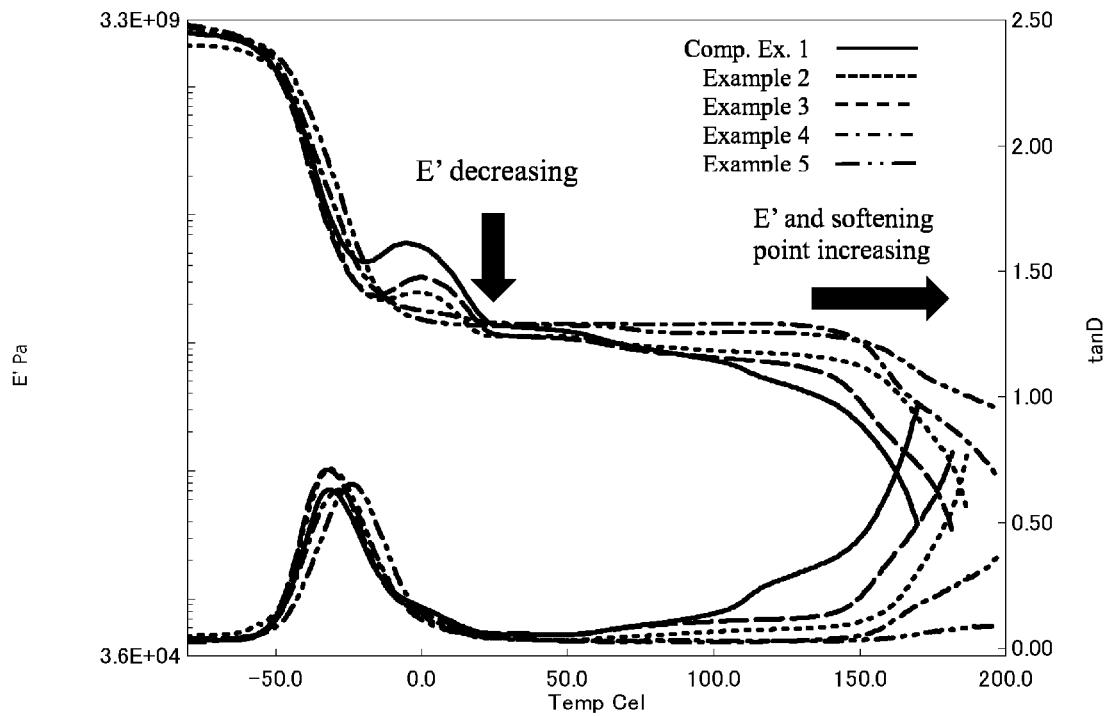
FIG. 1 is a graph showing temperature dependency of storage modulus (E') of Examples 2 to 5 and Comparative Example 1.

The present invention is described in more detail below by reference to preferred embodiments.

The polyol for a crosslinkable polyurethane resin composition, according to the present invention includes a high molecular polyol represented by the following formula (1) or (2) that is a condensate of a polyfunctional carboxylic acid (A) and a bifunctional polyether polyol (B), and has a content of the high molecular polyol having a number average molecular weight (Mn) of 1,000 to 10,000 being 0.1% to 15 wt %.

[Chem. 3]

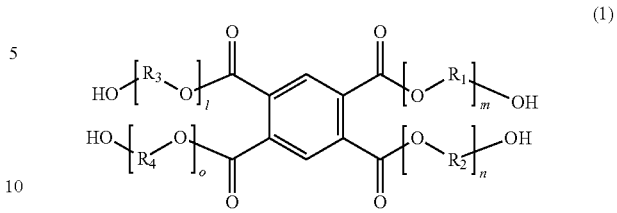

(1)

(In the formula, $R_1$ to $R_4$ each independently represent an alkyl chain having a carbon atom number of 3 to 5, and m, n, l and o each independently are an integer of 3 to 30.)

In the formula (1), m, n, l and o each independently are an integer of 3 to 30, and more preferably an integer of 3 to 10. In the case where m, n, l and o are smaller than 3, heat resistance is not sufficiently developed. In the case where m, n, l and o are larger than 30, the polyol has high viscosity, compatibility with an isocyanate component is deteriorated and as a result, satisfactory urethane properties are not obtained. Here, a plurality of $R_1$ may be the same as or different from each other. The same is applied to $R_2$, $R_3$ and $R_4$.

[Chem. 4]

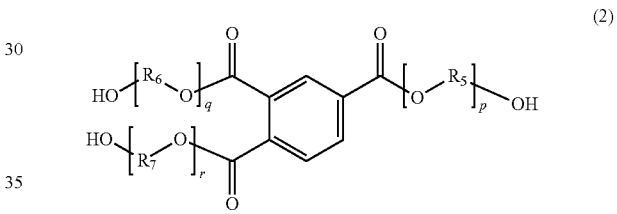

(2)

(In the formula, $R_5$ to $R_7$ each independently represent an alkyl chain having a carbon atom number of 3 to 5, and p, q and r each independently are an integer of 3 to 30.)

In the formula (2), p, q and r each independently is an integer of 3 to 30, and more preferably an integer of 3 to 10. In the case where p, q and r are smaller than 3, heat resistance is not sufficiently developed. In the case where p, q and r are larger than 30, the polyol has high viscosity, compatibility with an isocyanate component is deteriorated and as a result, satisfactory urethane properties are not obtained. Here, a plurality of $R_5$ may be the same as or different from each other. The same is applied to $R_6$ and $R_7$.

Examples of aromatic polycarboxylic acid used to constitute the polyfunctional carboxylic acid (A) include aromatic polycarboxylic acids having a carbon number of 9 to 30, for example, tricarboxylic acids such as trimellitic acid, 1,2,3-benzenetricarboxylix acid, trimesic acid, hemilittic acid, 1,2,4-, 1,3,6- or 2,3,6-naphthalenetricarboxylic acid, and 2,3,6-anthrathenetricarboxylic acid; tetracarboxyclic acids such as pyromellitic acid, 3,3',4,4'-benzophenone tetracarboxylic acid, 2,2',3,3'-benzophenone tetracarboxylic acid, 2,3,3',4'-benzophenone tetracarboxylic acid, 3,3',4,4'-biphenyltetracarboxylic acid, 2,2',3,3'-biphenyltetracarboxylic acid, 2,3,3',4'-biphenyltetracarboxylic acid, 4,4'-oxybisphthalic acid, diphenylmethane tetracarboxylic acid, 1,4,5,8-naphthalene tetraccarboxylic acid, 1,2,5,6-naphthalene tetracarboxylic acid, 2,3,6,7-naphthalene tetracarboxylic acid, and 4,4'-(hexafluoroisopropylidene)bisphthalic acid; and the like. Those aromatic polycarboxylic acids may be used in one kind alone and may be used in combination of two or more kinds.

Examples of polyether polyol of the bifunctional polyether polyol (B) include polytetramethylene ether glycol (PTG) and polypropylene ethylene polyol (PPG). Those polyether polyols may be used in one kind alone and may be used in combination of two or more kinds.

A polyester polyol and/or a polycarbonate polyol can be used in place of or in combination with the bifunctional polyether polyol (B). Examples of the polyester polyol include polyethylene adipate diol, polybutylene adipate diol, polyhexamethylene adipate diol, polyhexamethylene isophthalate diol, polyneopentylene adipate diol, polyethylene propylene adipate diol, polyethylene butylene adipate diol, polybutylene hexamethylene adipate diol, polydiethylene adipate diol, poly(polytetramethylene ether)adipate diol, poly(3-methylpentylene adipate)diol, polyethylene azelate diol, polyethylene sebacate diol, polybutylene azelate diol, polybutylene sebacate diol, and polyneopentylene terephthalate diol. Those polyester polyols may be used in one kind alone and may be used in combination of two or more kinds.

Examples of the polycarbonate polyol include polycarbonate polyols produced by condensing a dihydric alcohol having a carbon number of 2 to 9 with a low molecular carbonate compound (e.g., a dialkyl carbonate having a carbon number of 1 to 6 in the alkyl moiety, an alkylene carbonate having an alkylene group with a carbon number of 2 to 6 and a diaryl carbonate having an aryl group with a carbon number of 6 to 9) while conducting dealcoholization reaction. Dihydric alcohols having a carbon number of 2 to 9 and low molecular carbonate compounds may be used in combination of two or more kinds, respectively.

Specific examples of the polycarbonate polyol include polyhexamethylene carbonate diol, polypentamethylene carbonate diol, polytetramethylene carbonate diol, and poly(tetramethylene/hexamethylene) carbonate diol (e.g., diol obtained by condensing 1,4-butanediol and 1,6-hexanediol with a dialkyl carbonate while conducting dealcoholization reaction). Those polycarbonate polyols may be used in one kind alone and may be used in combination of two or more kinds.

In the polyol for a polyurethane resin of the present invention, the condensate of the polyfunctional carboxylic acid (A) and the bifunctional polyether polyol (B) can be produced by conventional methods. For example, a carboxylic acid may be subjected to an esterification reaction with an alcohol at 70° C. to 120° C., followed by a transesterification reaction with a polyether polyol, and alternatively, an anhydrous carboxylic acid may be subjected to an esterification reaction with a polyether polyol.

Usually, a conventional esterification catalyst is used in the esterification reaction in the present invention. An acid catalyst is generally used as the catalyst. Examples of Lewis acid that can be used include orthotitanic esters such as tetraisopropyl titanate and tetra-n-butyl titanate, tin compounds such as diethyltin oxide and dibutyltin oxide, and metal compounds such as zinc oxide. Other than Lewis acid, Bronsted acid such as p-toluenesulfonic acid may be used.

In the polyol for a polyurethane resin of the resent invention, the condensate of the polyfunctional carboxylic acid (A) with the bifunctional polyether polyol (B) is a high molecular polyol represented by the formula (1) or (2). In the case of tetrafunctional carboxylic acid, it is the high molecular polyol represented by the formula (1), and in the case of trifunctional carboxylic acid, it is the high molecular polyol represented by the formula (2).

The condensate of the polyfunctional carboxylic acid (A) with the bifunctional polyether polyol (B) of the present invention has a number average molecular weight (Mn) preferably in a range of 1,000 to 10,000, more preferably 1,500 to 8,500 and still more preferably in a range of 2,000 to 4,000. In the case where the number average molecular weight (Mn) of the condensate is smaller than 1,000, heat resistance is not sufficiently developed. On the other hand, in the case where the number average molecular weight (Mn) of the condensate is larger than 10,000, compatibility is deteriorated and satisfactory urethane properties cannot be obtained.

The condensate of the polyfunctional carboxylic acid (A) with the bifunctional polyether polyol (B) of the present invention may be used in a mixture with a conventional polyol (D) for a polyurethane resin. The polyol (D) to be mixed with the condensate has a number average molecular weight (Mn) of preferably 250 to 5,000 and more preferably 250 to 700. In the case where the number average molecular weight (Mn) of the polyol (D) to be mixed with the condensate is smaller than 250, heat resistance is not sufficiently developed. On the other hand, in the case where the number average molecular weight (Mn) of the polyol (D) to be mixed with the condensate is larger than 5,000, compatibility is deteriorated and satisfactory urethane properties cannot be obtained.

The polyol (D) is desirably a polyether polyol and/or a polyester polyol.

Examples of the polyether polyol as the polyol (D) include polytetramethylene ether glycol (PTG) and polypropylene ethylene polyol (PPG).

Examples of the polyester polyol as the polyol (D) include polyethylene adipate diol, polybutylene adipate diol, polyhexamethylene adipate diol, polyhexamethylene isophthalte diol, polyneopentylene adipate diol, polyethylene propylene adipate diol, polyethylene butylene adipate diol, polybutylene hexamethylene adipate diol, polydiethylene adipate diol, poly(polytetramethylene ether)adipate diol, poly(3-methylpentylene adipate)diol, polyethylene azelate diol, polyethylene sebacate diol, polybutylene azelate diol, polybutylene sebacate diol, and polyneopentylene terephthalate diol. Those polyols (D) may be used in one kind alone and may be used in combination of two or more kinds.

The condensate of the polyfunctional carboxylic acid (A) with the bifunctional polyether polyol (B) of the present invention is the high molecular polyol having a number average molecular weight (Mn) in a range of 1,000 to 10,000. The condensate is mixed with, for example, the conventional polyol (D) for a polyurethane resin to provide a polyol for a crosslinkable polyurethane resin composition. The content of the condensate in the polyol for a crosslinkable polyurethane resin composition is 0.1 wt % to 15 wt %, preferably 0.5 wt % to 10 wt % and more preferably 1 wt % to 5 wt %.

As compared with a conventional polyol for a crosslinkable polyurethane resin, since the polyol for a crosslinkable polyurethane resin composition of the present invention contains a high molecular polyol of the condensate, after reacting with an organic polyisocyanate component, a part of the resin forms a steric network structure through a crosslinking reaction and as a result, heat-aging resistance is improved.

In the case where the content of the high molecular polyol of the condensate in the polyol for a crosslinkable polyurethane resin composition of the present invention is less than 0.1 w %, satisfactory heat-aging resistance may not be obtained in some cases. On the other hand, in the case where the content of the high molecular polyol of the condensate is larger than 15 wt %, compatibility may be deteriorated and satisfactory urethane properties may not be obtained in some cases.

In the case where the high molecular polyol represented by the formula (1) or (2) of the present invention is mixed with the polyol (D), the content of the polyol (D) in the crosslinkable polyurethane resin is preferably 62 wt % to 76.9 wt % and more preferably 72 wt % to 76 wt %. The addition of the polyol (D) can make a polyurethane resin obtained after curing reaction to have sufficient hardness, and excellent flexibility and heat resistance.

A method for producing the crosslinkable polyurethane resin of the present invention is not particularly limited, and it can be produced by conventional methods. For example, a polyisocyanate component may be charged en bloc in a polyol, a chain extender and an organometallic catalyst, to conduct a reaction. Alternatively, a polyol is reacted with a polyisocynate component to obtain an isocyanate group-ended prepolymer, and thereto is then added a chain extender, followed by conducting an elongation reaction.

Examples of the polyisocyanate compound include aromatic, alicyclic or aliphatic polyisocyanates having two or more isocyanate groups.

Specific examples thereof include polyisocyanates such as tolylene diisocyanate (TDI), diphenylmethane diisocyanate (MDI), polymethylene polyphenyl polyisocyanate (PMDI), xylene diisocyanate (XDI), isophorone diisocyanate (IPDI), and hexamethylene diisocyanate (HMDI). Of those, MDI is particularly preferred from the standpoints of easy availability and easy control of the reaction with a hydroxyl group.

Examples of the chain extender include low molecular weight dihydric alcohols such as 1,3-propanediol, 1,4-butanediol and 1,5-pentanediol.

The organometallic catalyst is not particularly limited, and specific examples thereof include organotin catalysts such as dibutyltin oxide, dibutyltin diacetate, dibutyltin dilaurate, dibutyltin dichloride, and dioctyltin dilaurate; nickel octylate, nickel naphthenate, cobalt octylate, cobalt naphthenate, bismuth octylate, bismuth naphthenate, and the like. Of those, an organotin catalyst is preferred and dibutyltin dilaurate is more preferred.

In the case where another organometallic catalyst or a tertiary amine catalyst is used in the present invention, the content thereof is generally in a range of 0.0001 to 5.0 parts by weight and more preferably in a range of 0.001 to 3.0 parts by weight, per 100.0 parts by weight of the polyol.

The measurement methods used in the present invention are described below.

[Measurement of Number Average Molecular Weight (Mn)]

Number average molecular weight (Mn) of the polyol for a polyurethane resin in the present invention can be measured by using a gel permeation chromatography (hereinafter referred to as GPC) under, for example, the following conditions.

Apparatus: TOSOH HCL-8320
Column: TSKgel G4000H+G2500H (7.5 mm I. D×30 cm)
Detector: RI
Eluent: THF
Injection amount: 100 μL
Flow rate: 1.0 mL/min
Measurement temperature: 40° C.
Sample concentration: 0.3 wt/vol %

[Measurement of Hardness]

Hardness is measured by Type A according to JIS K7312 (1996)

Temperature dependency of storage modulus (E') as an index of heat resistance, softening point (tan δ) and melting point of the polyurethane resin are measured by the following methods.

[Measurement of Temperature Dependency of Storage Modulus (E') and Softening Point (Tan δ)]

Storage modulus (E') is measured by a dynamic viscoelasticity measurement (hereinafter referred to as DMA) under the following conditions.

Apparatus: DMA7100 (manufactured by Hitachi High-Tech Science Corporation)
Frequency: 10 Hz
Measurement temperature: −100° C. to 200° C.
Temperature rising rate: 2° C./min
Measurement mode: Tension
Film thickness: 2 mm The value of storage modulus (E') is obtained by reading values at −5° C., 0° C., 20° C., 120° C. and 140° C., and the softening point is calculated from tan δ.

Heat resistance of the resin is evaluated by using variation (%) of the value of storage modulus (E') at each temperature at 10 Hz with respect to E' (MPa) value at the ordinary temperature (20° C.) at 10 Hz.

Variation (%)=$(E'_t-E'_{20})/E'_{20} \times 100\%$

Here, $E'_t$ is E'(MPa) at −5° C., 0° C., 120° C. and 140° C. at 10 Hz, and $E'_{20}$ is E'(MPa) at the ordinary temperature (20° C.) at 10 Hz.

As for the crosslinkable polyurethane resin of the present invention, the storage modulus (E') in a temperature range of 0 to −5° C. at 10 Hz preferably increases 10% to 150% with respect to the storage modulus (E') at 20° C. at 10 Hz in the dynamic viscoelasticity measurement. In addition, as for the crosslinkable polyurethane resin of the present invention, the storage modulus (E') in a temperature range of 100° C. to 150° C. at 10 Hz preferably decreases 0% to 70% with respect to the storage modulus (E') at 20° C. at 10 Hz in the dynamic viscoelasticity measurement.

[Measurement of Melting Point]

Apparatus: DSC3100S (manufactured by MAC Science)
Atmosphere: Nitrogen gas (50 ml/min)
Amount of sample: 10 mg
Temperature: 20° C. to 300° C.
Temperature rising rate: 10° C./min

EXAMPLES

The present invention is described below by reference to Examples, but they do not limit the present invention at all. In Examples, all "parts" mean "parts by mass".

Example 1

(Synthesis of Methyl Ester of Pyromellitic Acid)

In a reactor were put 75.7 parts (0.28 mol) of pyromellitic acid, 315 parts (9.82 mol) of methanol and 8 parts of concentrated sulfuric acid. After refluxing at 66° C. for 1 hour, methanol was distilled away. In the reaction liquid was added 150 parts of toluene, followed by distillation by a Dean-Stark reflux pipe at 67 to 110° C. for 2 hours (distilled water: 22 parts). Thereto was added 200 parts of methanol, followed by refluxing at 66° C. for 1 hour, and methanol was then distilled away. Distillation was conducted by a Dean-Stark relfux pipe at 67 to 110° C. for 2 hours (distilled water: 4 parts). The reaction liquid was naturally cooled to 60° C., and in the reaction system was added an aqueous solution of 16 parts of potassium hydrogen carbonate and 75 parts of warm water, followed by washing and separation. Thereto was further added 18 parts of warm water, and washing and separation operations were conducted twice. The washed liquid was cooled to 7° C., and crystals precipitated were collected by filtration and dried at 80° C. under reduced pressure for 5 hours, to thereby obtain a methyl ester of pyromellitic acid (PMA) (86.3 parts, yield: 93%).

(Synthesis of Pyromellitic Acid PTG650 (PMA/PTG650) Polymer)

In a reactor were put 75.0 parts (0.24 mol) of methyl ester of pyromellitic acid (PMA) obtained above, 1,263 parts (1.93 mol) of PTG650SN (manufactured by Hodogaya Chemical Co., Ltd., PTG650SN, Mn: 650) and 1.0 part of tetra-n-butyltin, followed by refluxing at 130° C. to 135° C. for 2 hours. Methanol was distilled away at 135 to 194° C. for 5 hours. After cooling to 60° C., in the reaction liquid were added 500 parts of toluene and 4,577 parts of 47% sulfuric acid, followed by washing and separation. After washing with 1,624 parts of warm water and separating, the resultant was concentrated, to thereby obtain a pyromellitic acid PTG650 (PMA/PTG650) polymer (amount obtained: 587 parts, yield: 82%).

The number average molecular weight (Mn) of the pyromellitic acid PTG650 (PMA/PTG650) polymer measured by the above-mentioned measurement method of the number average molecular weight (Mn) of a high molecular polyol was 2,827.

Example 2

(Preparation of Crosslinkable Polyurethane Resin)

In a reactor were put 0.1 parts of the PMA/PTG650 polymer obtained in Example 1 and 100 parts of PTG2000SN (manufactured by Hodogaya Chemical Co., Ltd., Mn: 2000), followed by drying at 100° C. for 1 hour. After naturally cooling to 70° C., thereto was added 28 parts (0.11 mol) of MDI (NCO: 4%, manufactured by Nippon Polyurethane Industry Co., Ltd.), followed by stirring at 80° C. for 3 hours. The pressure was gradually reduced to 5 mmHg to perform defoamation. After cooling to an inner temperature of 70° C., thereto was added 5 parts (0.06 mol) of 1,4-butanediol, followed by stirring for 3 minutes. The resultant was poured on a glass plate and aged at 100° C. for 24 hours, to thereby prepare a sheet of a crosslinkable polyurethane resin. Temperature dependency of storage modulus (E'), hardness and melting point were measured. The temperature dependency of storage modulus (E') is shown in FIG. 1. Measured values of hardness, melting point and storage modulus of the crosslinkable polyurethane resin are shown in Table 1. Variations (%) of E' (MPa) at each temperature at 10 Hz with respect to E' (MPa) at ordinary temperature (20° C.) at 10 Hz are shown in Table 3.

Example 3

(Preparation of Crosslinkable Polyurethane Resin)

Preparation was conducted in the same manner as in Example 2 except for adding 1 part of PMA/PTG650 polymer obtained in Example 1, and temperature dependency of storage modulus (E'), hardness and melting point were measured. The temperature dependency of storage modulus (E') is shown in FIG. 1. Measured values of hardness, melting point and storage modulus are shown in Table 1. Variations (%) of E' (MPa) at each temperature at 10 Hz with respect to E' (MPa) at ordinary temperature (20° C.) at 10 Hz are shown in Table 3.

Example 4

(Preparation of Crosslinkable Polyurethane Resin)

Preparation was conducted in the same manner as in Example 2 except for adding 5 parts of PMA/PTG650 polymer obtained in Example 1, and temperature dependency of storage modulus (E'), hardness and melting point were measured. The temperature dependency of storage modulus (E') is shown in FIG. 1. Measured values of hardness, melting point and storage modulus are shown in Table 1. Variations (%) of E' (MPa) at each temperature at 10 Hz with respect to E' (MPa) at ordinary temperature (20° C.) at 10 Hz are shown in Table 3.

Example 5

(Preparation of Crosslinkable Polyurethane Resin)

Preparation was conducted in the same manner as in Example 2 except for adding 10 parts of PMA/PTG650 polymer obtained in Example 1, and temperature dependency of storage modulus (E'), hardness and melting point were measured. The temperature dependency of storage modulus (E') is shown in FIG. 1. Measured values of hardness, melting point and storage modulus are shown in Table 1. Variations (%) of E' (MPa) at each temperature at 10 Hz with respect to E' (MPa) at ordinary temperature (20° C.) at 10 Hz are shown in Table 3.

Example 6

(Synthesis of Pyromellitic Acid PTG2000 (PMA/PTG2000) Polymer)

In a reactor were put 6.3 parts (0.02 mol) of methyl ester of pyromellitic acid obtained in Example 1, 244.0 parts (0.12 mol) of PTG2000SN (manufactured by Hodogaya Chemical Co., Ltd., Mn: 2,000) and 0.1 parts of tetra-n-butyltin, followed by refluxing at 130° C. to 135° C. for 2 hours. Methanol was distilled away at 135 to 195° C. for 5 hours. After cooling to 60° C., in the reaction liquid were added 500 parts of toluene and 1,000 parts of warm water, followed by washing and separation. The resultant was concentrated, to thereby obtain a pyromellitic acid PTG2000 (PMA/PTG2000) polymer (amount obtained: 240 parts, yield: 94%).

The number average molecular weight (Mn) of the pyromellitic acid PTG2000 (PMA/PTG2000) polymer measured by the above-mentioned measurement method of the number average molecular weight (Mn) of a high molecular polyol was 8,296.

Example 7

(Preparation of Crosslinkable Polyurethane Resin)

Figure 2:
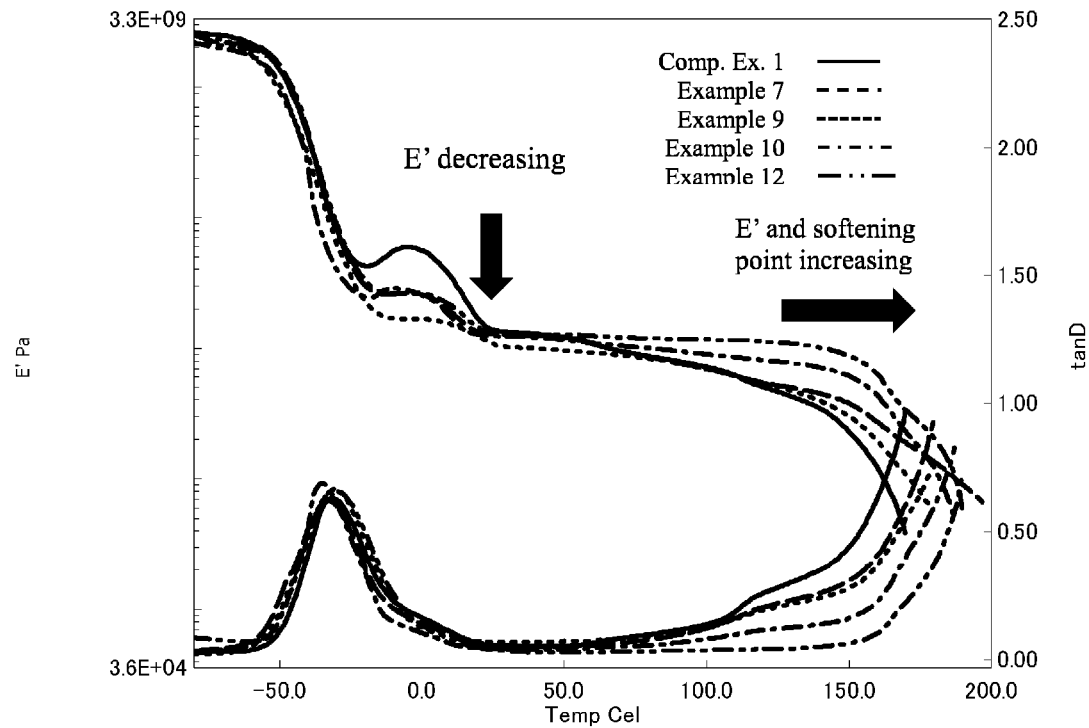
FIG. 2 is a graph showing temperature dependency of storage modulus (E') of Examples 7, 9, 10 and 12 and Comparative Example 1.

In a reactor were put 10 parts of PMA/PTG2000 polymer obtained in Example 6 and 100 parts of PTG2000SN (manufactured by Hodogaya Chemical Co., Ltd., Mn: 2,000), followed by drying at 100° C. for 1 hour. After naturally cooling to 70° C., thereto was added 28 parts (0.11 mol) of MDI (NCO: 4%, manufactured by Nippon Polyurethane Industry Co., Ltd.), followed by stirring at 80° C. for 3 hours. The pressure was gradually reduced to 5 mmHg to perform defoamation. After cooling to an inner temperature of 70° C., thereto was added 5 parts (0.06 mol) of 1,4-butanediol, followed by stirring for 3 minutes. The resultant was poured on a glass plate and aged at 100° C. for 24 hours, to thereby prepare a sheet of a crosslinkable polyurethane resin. Temperature dependency of storage modulus (E'), hardness and melting point were measured. The temperature dependency of storage modulus (E') is shown in FIG. 2. Measured values of hardness, melting point and storage modulus of the crosslinkable polyurethane resin are shown in Table 1. Variations (%) of E' (MPa) at each temperature at 10 Hz with respect to E' (MPa) at ordinary temperature (20° C.) at 10 Hz are shown in Table 3.

Example 8

(Synthesis of Pyromellitic Acid PTG250 (PMA/PTG250) Polymer)

In a reactor were put 27.2 parts (0.09 mol) of methyl ester of pyromellitic acid obtained in Example 1, 93.7 parts (0.36 mol) of PTG250SN (manufactured by Hodogaya Chemical Co., Ltd., Mn: 250) and 0.1 parts of tetra-n-butyltin, followed by refluxing at 130° C. to 135° C. for 2 hours. Methanol was distilled away at 135 to 195° C. for 5 hours. After cooling to 60° C., in the reaction liquid were added 500 parts of toluene and 1,000 parts of warm water, followed by washing and separation. The resultant was concentrated, to thereby obtain a pyromellitic acid PTG250 (PMA/PTG250) polymer (amount obtained: 100 parts, yield: 83%).

The number average molecular weight (Mn) of the pyromellitic acid PTG250 (PMA/PTG250) polymer measured by the above-mentioned measurement method of the number average molecular weight (Mn) of a high molecular polyol was 1,218.

Example 9

(Preparation of Crosslinkable Polyurethane Resin)

In a reactor were put 1 part of PMA/PTG250 polymer obtained in Example 8 and 100 parts of PTG2000SN (manufactured by Hodogaya Chemical Co., Ltd., Mn: 2,000), followed by drying at 100° C. for 1 hour. After naturally cooling to 70° C., thereto was added 28 parts (0.11 mol) of MDI (NCO: 4%, manufactured by Nippon Polyurethane Industry Co., Ltd.), followed by stirring at 80° C. for 3 hours. The pressure was gradually reduced to 5 mmHg to perform defoamation. After cooling to an inner temperature of 70° C., thereto was added 5 parts (0.06 mol) of 1,4-butanediol, followed by stirring for 3 minutes. The resultant was poured on a glass plate and aged at 100° C. for 24 hours, to thereby prepare a sheet of a crosslinkable polyurethane resin. Temperature dependency of storage modulus (E'), hardness and melting point were measured. The temperature dependency of storage modulus (E') is shown in FIG. 2. Measured values of hardness, melting point and storage modulus of the crosslinkable polyurethane resin are shown in Table 2. Variations (%) of E' (MPa) at each temperature at 10 Hz with respect to E' (MPa) at ordinary temperature (20° C.) at 10 Hz are shown in Table 3.

Example 10

(Preparation of Crosslinkable Polyurethane Resin)

A crosslinkable polyurethane resin was prepared in the same manner as in Example 9 except for adding 5 parts of PMA/PTG250 polymer obtained in Example 8, and temperature dependency of storage modulus (E'), hardness and melting point were measured. The temperature dependency of storage modulus (E') is shown in FIG. 2. Measured values of hardness, melting point and storage modulus are shown in Table 2. Variations (%) of E' (MPa) at each temperature at 10 Hz with respect to E' (MPa) at ordinary temperature (20° C.) at 10 Hz are shown in Table 3.

Example 11

(Synthesis of Methyl Ester of Trimellitic Acid)

In a reactor were put 80.2 parts (0.38 mol) of trimellitic acid, 60.4 parts (1.89 mol) of methanol and 0.8 parts of concentrated sulfuric acid. After refluxing at 66° C. for 1 hour, methanol was distilled away. In the reaction liquid was added 150 parts of toluene, followed by distillation by a Dean-Stark reflux pipe at 67 to 110° C. for 2 hours (distilled water: 22 parts). Thereto was added 200 parts of methanol, followed by refluxing at 66° C. for 1 hour, and methanol was then distilled away. Distillation was conducted by a Dean-Stark reflux pipe at 67 to 110° C. for 2 hours (distilled water: 5 parts). The reaction liquid was naturally cooled to 60° C., and in the reaction system was added an aqueous solution of 16 parts of potassium hydrogen carbonate and 75 parts of warm water, followed by washing and separation. Thereto was further added 18 parts of warm water, and washing and separation operations were conducted twice. The washed liquid was cooled to 7° C., and crystals precipitated were collected by filtration and dried at 80° C. under reduced pressure for 5 hours, to thereby obtain a methyl ester of trimellitic acid (92 parts, yield: 80%).

(Synthesis of Trimellitic Acid PTG650 (TMA/PTG650) Polymer)

In a reactor were put 20.0 parts (0.07 mol) of methyl ester of trimellitic acid obtained above, 133 parts (0.20 mol) of PTG650SN (manufactured by Hodogaya Chemical Co., Ltd., Mn: 650) and 0.5 parts of tetra-n-butyltin, followed by refluxing at 130° C. to 135° C. for 2 hours. Methanol was distilled away at 135 to 194° C. for 5 hours. After cooling to 60° C., washing and separation were conducted by 500 parts of toluene and 1,000 parts of warm water. The resultant was concentrated, to thereby obtain a trimellitic acid PTG650 (TMA/PTG650) polymer (amount obtained: 140 parts, yield: 91%).

The number average molecular weight (Mn) of the trimellitic acid PTG650 (TMA/PTG650) polymer measured by the above-mentioned measurement method of the number average molecular weight (Mn) of a high molecular polyol was 2,774.

Example 12

(Preparation of Crosslinkable Polyurethane Resin)

In a reactor were put 1 part of TMA/PTG650 polymer obtained in Example 11 and 100 parts of PTG2000SN (manufactured by Hodogaya Chemical Co., Ltd., Mn: 2,000), followed by drying at 100° C. for 1 hour. After naturally cooling to 70° C., thereto was added 28 parts (0.11 mol) of MDI (NCO: 4%, manufactured by Nippon Polyurethane Industry Co., Ltd.,), followed by stirring at 80° C. for 3 hours. The pressure was gradually reduced to 5 mmHg to perform defoamation. After cooling to an inner temperature of 70° C., thereto was added 5 parts (0.06 mol) of 1,4-butanediol, followed by stirring for 3 minutes. The resultant was poured on a glass plate and aged at 100° C. for 24 hours, to thereby prepare a sheet of a crosslinkable polyurethane resin. Temperature dependency of storage modulus (E'), hardness and melting point were measured. The temperature dependency of storage modulus (E') is shown in FIG. 2. Measured values of hardness, melting point and storage modulus are shown in Table 2. Variations (%) of E' (MPa) at each temperature at 10 Hz with respect to E' (MPa) at ordinary temperature (20° C.) at 10 Hz are shown in Table 3.

Comparative Example 1

(Preparation of Crosslinkable Polyurethane Resin)

In a reactor was put 100 parts of PTG2000SN (manufactured by Hodogaya Chemical Co., Ltd., Mn: 2,000), followed by drying at 100° C. for 1 hour. After naturally cooling to 70° C., thereto was added 28 parts (0.11 mol) of MDI (NCO: 4%, manufactured by Nippon Polyurethane Industry Co., Ltd.), followed by stirring at 80° C. for 3 hours. The pressure was gradually reduced to 5 mmHg to perform defoamation. After cooling to an inner temperature of 70° C., thereto was added 5 parts (0.06 mol) of 1,4-butanediol, followed by stirring for 3 minutes. The resultant was poured on a glass plate and aged at 100° C. for 24 hours, to thereby prepare a sheet of a crosslinkable polyurethane resin. Temperature dependency of storage modulus (E'), hardness and melting point were measured. The temperature dependency of storage modulus (E') is shown in FIG. 1 and FIG. 2. Measured values of hardness, melting point and storage modulus are shown in Table 2. Variations (%) of E' (MPa) at each temperature at 10 Hz with respect to E' (MPa) at ordinary temperature (20° C.) at 10 Hz are shown in Table 3.

TABLE 1

| Resin composition | | | | Example 2 | Example 3 | Example 4 | Example 5 | Example 7 |
|---|---|---|---|---|---|---|---|---|
| Polyol (parts) | (B) | | PTG2000SN | 100 | 100 | 100 | 100 | 100 |
| | (C) | Ex. 1 | PMA/PTG650 Polymer | 0.1 | 1 | 5 | 10 | |
| | | Ex. 6 | PMA/PTG2000 Polymer | | | | | 10 |
| Organic polyisocyanate (parts) | MDI | | | 28 | 28 | 28 | 28 | 28 |
| Chain extender (parts) | 1,4-Butanediol | | | 5 | 5 | 5 | 5 | 5 |
| Proportion of (B) in polyurethane resin (wt %) | | | | 75 | 75 | 73 | 70 | 70 |
| Proportion of (C) in polyurethane resin (wt %) | | | | 0.1 | 1 | 4 | 7 | 7 |
| Evaluation results of urethane resin | Hardness (JIS-A) | | | 78 | 78 | 80 | 82 | 74 |
| | Melting Point (° C.) | | | 165 | 166 | 168 | 169 | 165 |
| | Softening point (tan δ, ° C.) | | | 163 | 154 | 175 | 180 | 156 |
| | 10 Hz, E' (MPa) | −5 | | | 24 | 30 | 19 | 16 | 26 |
| | | 0 | | 25 | 32 | 18 | 15 | 26 |
| | | 20 | | 12 | 14 | 15 | 14 | 13 |
| | | 120 | | 8 | 7 | 14 | 12 | 5 |
| | | 140 | | 7 | 5 | 12 | 11 | 4 |

TABLE 2

| Resin composition | | | | Example 9 | Example 10 | Example 12 | Comp. Ex. 1 |
|---|---|---|---|---|---|---|---|
| Polyol (parts) | (B) | | PTG 2000-SN | 100 | 100 | 100 | 100 |
| | (C) | Ex. 8 | PMA/PTG-250 Polymer | 1 | 5 | | |
| | | Ex. 11 | TMA/PTG-650 Polymer | | | 1 | |
| Organic polyisocyanate (parts) | MDI | | | 28 | 28 | 28 | 28 |
| Chain extender (parts) | 1,4-Butanediol | | | 5 | 5 | 5 | 5 |
| Proportion of (B) in polyurethane resin (wt %) | | | | 75 | 73 | 75 | 75 |
| Proportion of (C) in polyurethane resin (wt %) | | | | 0.4 | 4 | 1 | 0 |
| Evaluation results of urethane resin | Hardness (JIS-A) | | | 73 | 75 | 76 | 75 |
| | Melting point (° C.) | | | 168 | 168 | 171 | 156 |
| | Softening point (tan δ, ° C.) | | | 162 | 166 | 173 | 149 |
| | 10 Hz E' (MPa) | −5 | | 17 | 28 | 26 | 60 |
| | | 0 | | 17 | 25 | 26 | 56 |
| | | 20 | | 12 | 13 | 14 | 17 |
| | | 120 | | 5 | 8 | 11 | 5 |
| | | 140 | | 4 | 7 | 10 | 3 |

TABLE 3

| | Variation (%) to E' (MPa) at ordinary temperature (20° C.) at 10 Hz | | | | |
|---|---|---|---|---|---|
| | −5° C. | 0° C. | 20° C. | 120° C. | 140° C. |
| Example 2 | 105% | 112% | 0 | −29% | −36% |
| Example 3 | 121% | 139% | 0 | −49% | −60% |
| Example 4 | 29% | 23% | 0 | −3% | −14% |
| Example 5 | 21% | 12% | 0 | −12% | −17% |
| Example 7 | 98% | 94% | 0 | −59% | −66% |
| Example 9 | 36% | 36% | 0 | −57% | −68% |
| Example 10 | 119% | 102% | 0 | −36% | −44% |
| Example 12 | 88% | 86% | 0 | −19% | −28% |
| Comparative Example | 258% | 234% | 0 | −70% | −80% |

As shown in Table 1, Table 2, Table 3, FIG. 1, and FIG. 2, as compared with Comparative Example 1, the crosslinkable polyurethane resins of the present invention maintain hardness and simultaneously have the tendency that melting point and softening point increase and variations of E' (MPa) at 120° C. and 140° C. at 10 Hz are small. Furthermore, as compared with Comparative Example 1, the crosslinkable polyurethane resins of the present invention maintain hardness and simultaneously have the tendency that variations of E' (MPa) at −5° C. and 0° C. at 10 Hz are small. In other words, the crosslinkable polyurethane resin obtained by reacting the polyol for a crosslinkable polyurethane resin of the present invention with an organic polyisocyanate component can maintain dynamic characteristics and is useful as a urethane resin having excellent low-temperature properties, elastic properties and heat resistance.

Although the present invention has been described in detail and by reference to the specific embodiments, it is apparent to one skilled in the art that various modifications or changes can be made without departing the spirit and scope of the present invention.

This application is based on Japanese Patent Application No. 2018-114917 filed on Jun. 15, 2018 and Japanese Patent Application No. 2019-108531 filed on Jun. 11, 2019, the disclosures of which are incorporated herein by reference.

INDUSTRIAL APPLICABILITY

When the polyurethane resin composition of the present invention is used, the polyurethane resin obtained has excellent low-temperature properties, elastic properties and thermal durability and therefore, can be used in the fields of electric appliances, electronic parts and the like.

What is claimed is:

1. A polyol for a crosslinkable polyurethane resin composition, comprising a high molecular polyol represented by the following formula (1) or (2), wherein the high molecular polyol is a condensate of a polyfunctional carboxylic acid (A) with a bifunctional polyether polyol (B), the high molecular polyol has a number average molecular weight (Mn) in a range of 1,000 to 10,000, and the polyol for a crosslinkable polyurethane resin composition has a content of the high molecular polyol of 0.1 wt % to 15 wt %:

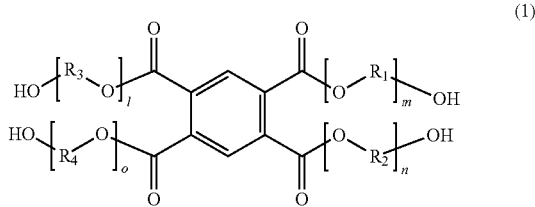

(1)

wherein in formula (1), $R_1$ to $R_4$ each independently represent an alkyl chain having a carbon atom number of 3 to 5, and m, n, l and o each independently are an integer of 3 to 30;

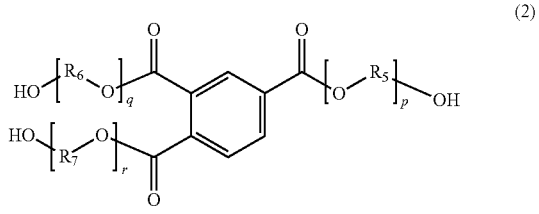

(2)

wherein in formula (2), $R_5$ to $R_7$ each independently represent an alkyl chain having a carbon atom number of 3 to 5, and p, q and r each independently are an integer of 3 to 30.

2. The polyol for a crosslinkable polyurethane resin composition, according to claim 1, wherein the polyfunctional carboxylic acid (A) is at least one selected from the group consisting of pyromellitic acid and trimellitic acid.

3. The polyol for a crosslinkable polyurethane resin composition, according to claim 1, wherein the bifunctional polyether polyol (B) has a carbon atom number of 3 to 5 in a repeating unit.

4. The polyol for a crosslinkable polyurethane resin composition, according to claim 3, wherein the bifunctional polyether polyol (B) is at least one selected from the group consisting of polytetramethylene ether glycol and polypropylene ethylene polyol.

5. A crosslinkable polyurethane resin, which is a reaction product of the polyol for a crosslinkable polyurethane resin composition, described in claim 1, with an organic polyisocyanate component.

6. The crosslinkable polyurethane resin according to claim 5, having a storage modulus (E') at 10 Hz in a temperature range of 100° C. to 150° C. decreasing 0% to 70% with respect to a storage modulus (E') at 10 Hz at 20° C. in a dynamic viscoelasticity measurement.

7. The crosslinkable polyurethane resin according to claim 5, having a storage modulus (E') at 10 Hz in a temperature range of 0° C. to −5° C. increasing 10% to 150% with respect to a storage modulus (E') at 10 Hz at 20° C. in a dynamic viscoelasticity measurement.

8. The crosslinkable polyurethane resin according to claim 5, having a storage modulus (E') at 10 Hz in a temperature range of 0° C. to −5° C. increasing 10% to 150% and a storage modulus (E') at 10 Hz in a temperature range of 100° C. to 150° C. decreasing 0% to 70%, with respect to a storage modulus (E') at 10 Hz at 20° C. in a dynamic viscoelasticity measurement.

9. The polyol for a crosslinkable polyurethane resin composition, according to claim 1, wherein the high molecular polyol has a number average molecular weight (Mn) in a range of 1,500 to 10,000.

10. The polyol for a crosslinkable polyurethane resin composition, according to claim 1, wherein the high molecular polyol has a number average molecular weight (Mn) in a range of 2,000 to 10,000.

* * * * *